No. 628,071. Patented July 4, 1899.
W. BUTTERFIELD.
CORD KNOTTING AND HOLDING DEVICE FOR GRAIN BINDERS.
(Application filed Jan. 18, 1897. Renewed Feb. 8, 1899.)
(No Model.) 4 Sheets—Sheet 2.
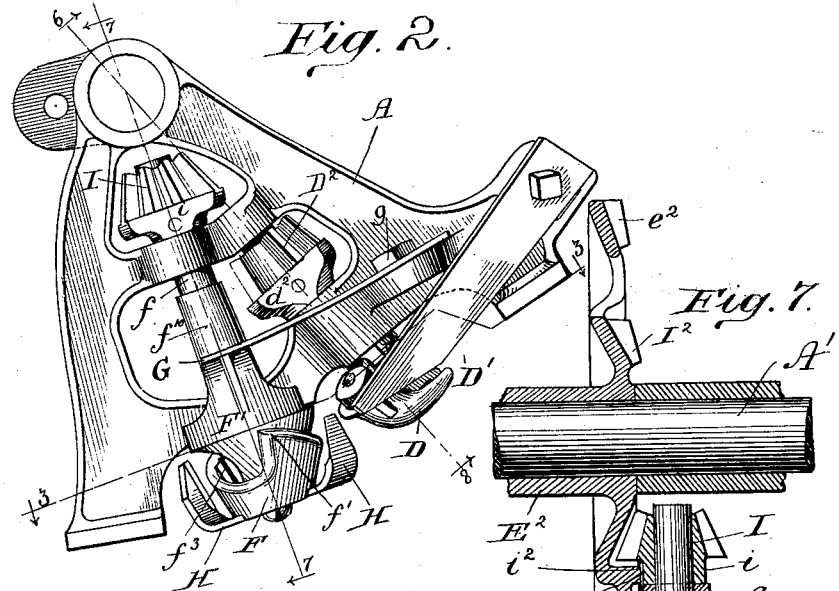
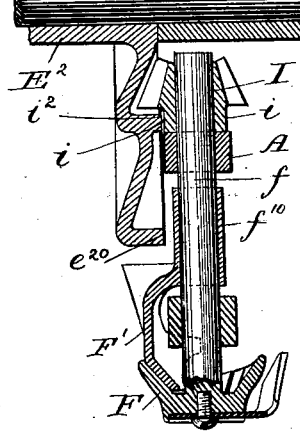
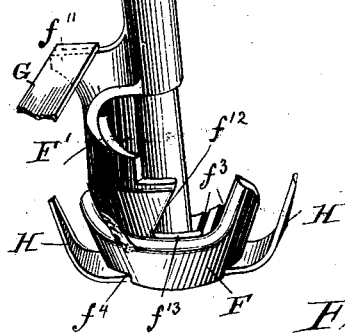
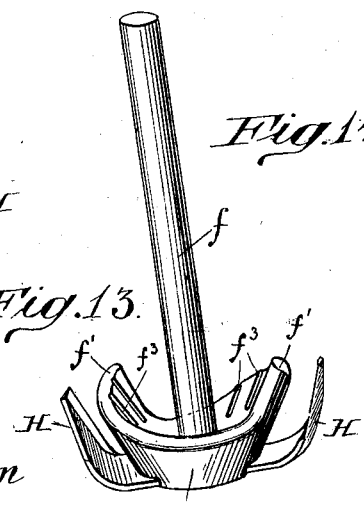
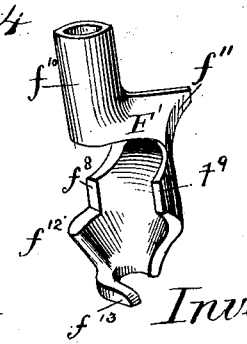
Witnesses
Arthur Johnson
E. A. Eldred
Inventor
William Butterfield No. 628,071. Patented July 4, 1899.
W. BUTTERFIELD.
CORD KNOTTING AND HOLDING DEVICE FOR GRAIN BINDERS.
(Application filed Jan. 18, 1897. Renewed Feb. 8, 1899.)
(No Model.) 4 Sheets—Sheet 3.
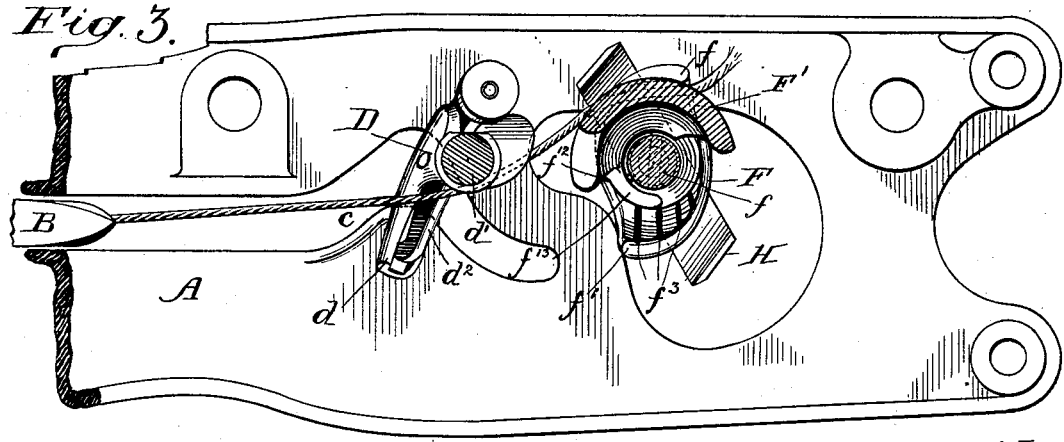
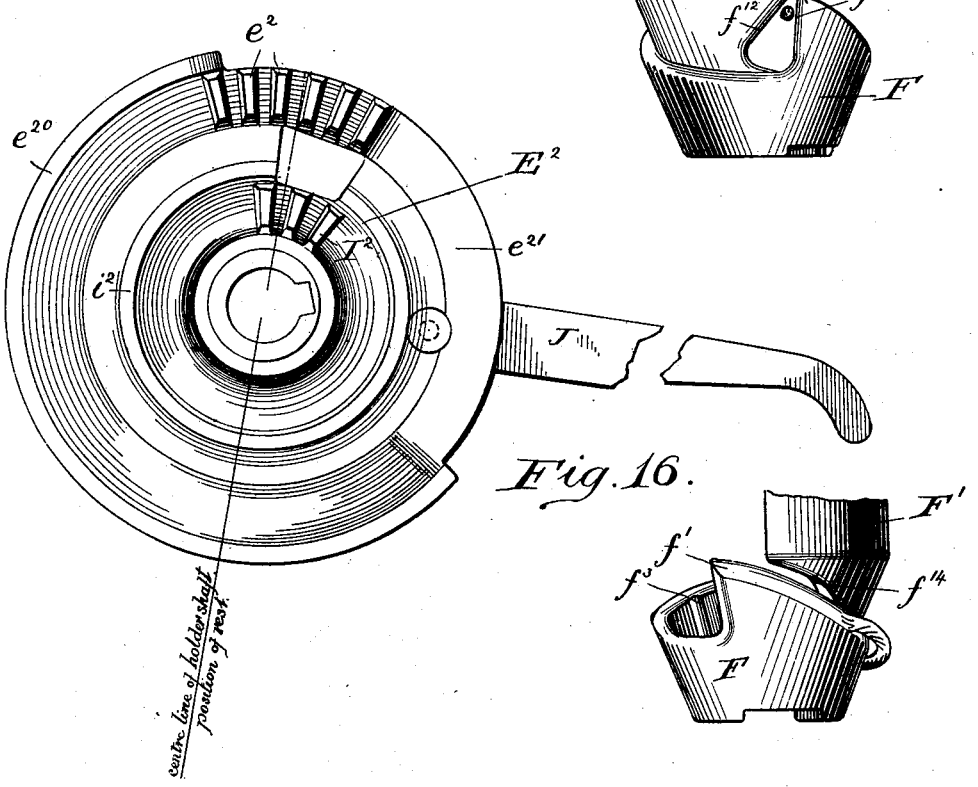
Witnesses.
Arthur Johnson
E. A. Eldred
Inventor.
William Butterfield

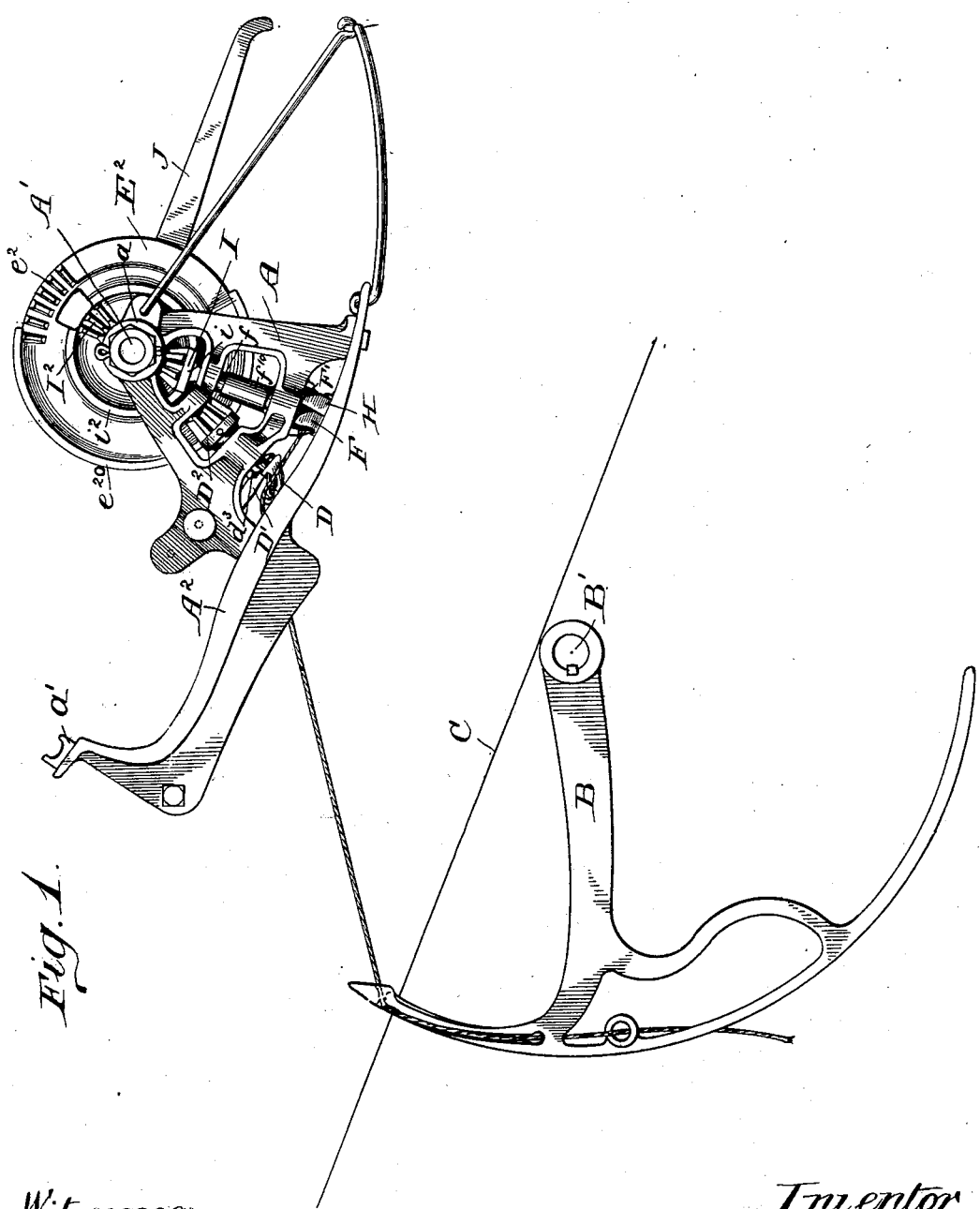

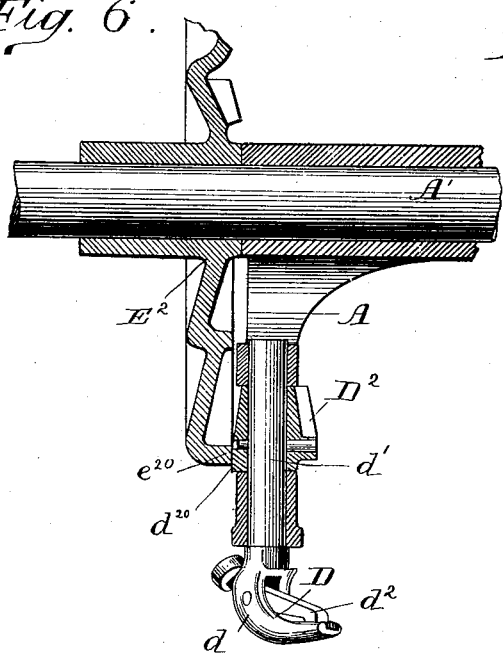
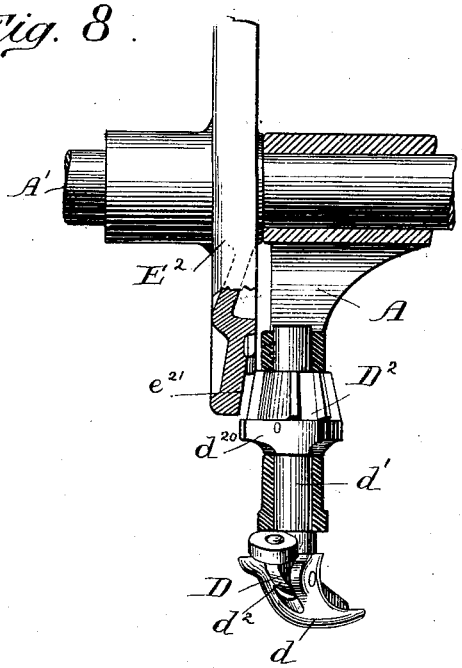
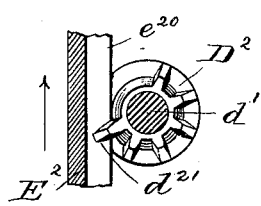
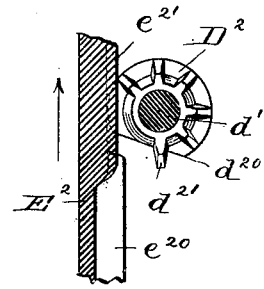
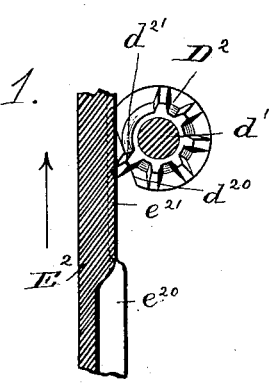

UNITED STATES PATENT OFFICE.

WILLIAM BUTTERFIELD, OF CHICAGO, ILLINOIS, ASSIGNOR TO THE DEERING HARVESTER COMPANY, OF SAME PLACE.

CORD KNOTTING AND HOLDING DEVICE FOR GRAIN-BINDERS.

SPECIFICATION forming part of Letters Patent No. 628,071, dated July 4, 1899.

Application filed January 18, 1897. Renewed February 8, 1899. Serial No. 704,988. (No model.)

*To all whom it may concern:*

Be it known that I, WILLIAM BUTTERFIELD, of Chicago, in the county of Cook and State of Illinois, have invented certain new and useful Improvements in Cord Knotting and Holding Devices for Grain-Binders, of which the following is a full description, reference being had to the accompanying drawings, in which—

Figure 1 is a rear side elevation showing the said devices and the twine-carrying needle. Fig. 2 is a front side elevation of the knotting and holding devices. All these figures represent the parts as if applied to what is known as a "left-hand-cut" harvester. Fig. 3 is a sectional view of the knotting devices as if cut on the line 3 3 of Fig. 2. Figs. 4, 5, 6, 7, 8, 9, 10, and 11 represent the mutilated gear for driving the knotting and holding shafts, and the respective pinions and their relations to each other. Figs. 12, 13 and 14 show the stationary and the rotatable portions of the holder. Figs. 15 and 16 are perspective views of the coacting parts of the holding device, as will be explained.

The object of the invention is to simplify the holding and cutting apparatus and permit the knot to be drawn from the knotter proper by the outgoing bundle.

C may be considered the upper surface of an ordinary binder-receptacle; B, a needle of the usual rocking form; D, the knotting device housed behind the breastplate D'; F, the rotary holder having wings $f'$ $f'$.

H and H are the twine-cutting blades.

A' is a shaft adapted to make one revolution during the operation of binding a single bundle. Upon it is the gear $E^2$. To this gear is secured the discharge-arm J. A fellow discharge-arm is, as usual, secured to the same shaft.

A is a frame in which the shafts of the knotting device and the rotary holder are journaled. In it the shaft A' is also journaled.

The mutilated gear-wheel $E^2$ is provided with the toothed segment $e^2$ and delay-rim $e^{20}$, which segment and delay-rim give the knotter-pinion rotation. A toothed segment $I^2$ and a delay-rim $i^2$ are also provided, which give a semirotation to the holder-shaft and maintain it in the position to which it is moved. The knotting-jaws are of the usual form, the lower member $d$ being as one piece with the shaft, and to which shaft is secured a pinion $D^2$. I make the rotary member F of the cord-holder as one piece with its shaft $f$.

I is the holder-pinion, having delay-surfaces $i$.

The knotting device is given two positions of rest, one while awaiting the presentation of the twines to be tied and another after about three-fourths of a revolution, where it rests until after the knot has been drawn therefrom by the outgoing bundle.

The operation of the knotter-driving segment and delay-rim differs only from those well known in the art by the means employed for controlling the periods of rotation and delay.

The knotter-pinion $D^2$ is provided with a single delay-surface $d^{20}$, which is adapted to ride on the delay-rim $e^{20}$, as shown in Fig. 6, the greater part of the time; but when in this position the knotter is thrown obliquely across the path of the twine, so that it may form a rest for the twine, and in consequence of this oblique or advanced position and early stopping of the knotter I am able to draw less twine from the holder than is done by the ordinary knotter in laying the knot. It will be seen that the delay-rim $e^{20}$ does not extend from one end of the segment $e^2$ all the way around the other end thereof, but is cut away for about one-quarter of the circumference of the wheel. As the segment $e^2$ on the wheel $E^2$ is given six teeth where the knotter-pinion has six, the ends of the delay-rim are depended upon to complete the revolution of the pinion. In Fig. 9 the shoe of the pinion is shown in its sliding position on the delay-rim, in which case the knotter-pinion is at its home position, as shown in Fig. 3. As this segment does not give the knotter its complete revolution, it is at the end of the time of laying the knot left as shown in Fig. 2, and backward movement is prevented by the roller on the jaw coming in contact with the cam $d^3$, in which case the knotter-pinion is as shown in Fig. 10, where it remains all of the time that the portion of the wheel $E^2$ is passing along it until the end of the delay-rim $e^{20}$ strikes the shoe, when it is carried to its home position— namely, that reaching obliquely across the path of the twine.

By reference to Fig. 8 it will be seen that any extraneous force might cause the pinion $D^2$ to rotate, in which case it would be thrown out of time, the delay-rim of the wheel not being permitted to engage it properly and carry it home. To prevent this, the tooth $d^{21}$ is made quite long, so that if attempt be made to turn the pinion forward it strikes the raised surface $e^{21}$ of the wheel, as shown in Fig. 11. These parts may be considered as merely a safety attachment, as they have nothing whatever to do with the normal operation of the knotting device.

In Fig. 3 all of the essential parts of the cord holding and cutting devices are shown. Upon the shaft $f$ is a sleeve $f^{10}$, upon which is formed the non-rotary element $F'$ of the holder. It is adapted to reach around the side of the supporting-frame and thence bundleward until it terminates in a semifrustum of a cone, the outer surface of which is made concentric with the shaft that supports it. Two stops $f^8$ and $f^9$ are provided, which rest against the side of the frame, as shown in Fig. 14, and prevent rotation. As seen from a point of view immediately above the operative portions of the non-rotary element of the holder, as shown in Fig. 3, the rotary element F of the holder is internally conical and adapted to fit closely over the non-rotary portion. Between the externally and internally coned portions the twine is held, and in order that the held end may be carried positively over the smooth surface of the non-rotary holder, thus insuring the proper length of twine within the grasp of the holders, the external or rotary holder is provided with flutes $f^3$. Upon the rotary element of the holder is formed the jaws $f'\,f'$. The relative position of the stationary jaw and the movable one is shown in Fig. 3, where the twine is seen as laid by the needle. The two edges of the jaws are so made that they shall come in contact at their upper ends in such a way as to practically surround the twine. Because of the "raking" direction given them the tendency is to slide the twine bundleward until it rests in the recess $f^{12}$ of the non-rotary element of the holder, and the rotary element is moved so far beyond that the twine is pressed for some length between the two parts. In order that there may be elastic pressure, the non-rotary part is adapted to slide on its supporting-shaft a little distance and be held there by the spring G, that is secured to the frame by a bolt $g$, and that rests upon the ledge $f^{11}$ of said non-rotary part. On the lower part of the non-rotary element is a guard or finger $f^{13}$, the purpose of which is to prevent twine being drawn under the edge of the stationary part when slack, as is the case at the time the needle commences its return movement. The jaw of the rotary part of the holder is made sufficiently long to engage the needle-twine, but the margin at once recedes, as shown in Fig. 16, for purposes that will be explained when treating of the operation of the holding device. Upon the holder-shaft are two knives H H, having a radius slightly greater than the jaws of the part to which they are secured. The operation is as follows: The parts of the holder are at rest in the position shown in Fig. 12 when the twine is brought down by the needle. At the proper interval the holder-shaft is given rotation and the jaws of the rotary part made to take the twine, as shown in Fig. 3, and carry it to the position shown in Fig. 12, where the parts come to rest. After the accumulation of the gavel and the needle is brought down again the knotter is given rotation and the twine for the knot laid thereon. About the instant that the knotter-jaws come open and close in the usual manner, have laid the knot, and seized the portion that is to form the bow the holder grasps the needle-twine, at which time the needle has begun to recede. The timing of the holder is such that at the time the knotter-jaws have taken the held ends of the twine the rotary part of the holder continues its movement, carrying the knife forward and severing the new twine. By the movement of this part of the holder the primary held end of the twine is set free. The knives are secured to the rotary element of the holder in such position that they cut the needle-twine at the interval that it is grasped by the holder.

What I claim as my invention, and desire to secure by Letters Patent, is—

1. The combination with a knotter-frame, of a cord-holder consisting of a rotary member and a non-rotary member, said rotary member being journaled in the knotter-frame, and said non-rotary member being supported upon the shaft of the rotary member between it and the frame, and being also connected to the frame so as to be held against rotation, the two members of the holder being conical and one adapted to fit within the other with their axes coincident, and one of said cones being adapted to move longitudinally relative to the other, and a spring secured to the knotter-frame and acting to hold the cones together with an elastic yielding pressure.

2. The combination with a knotter-frame, of a cord-holder, the non-rotary member of which is located between the frame and the rotating member and is supported upon the shaft of the rotary member, said non-rotary member being connected with the knotter-frame so as to be movable longitudinally upon the shaft of the rotary member, and having stops abutting against the frame to hold it against rotation, and a spring to press it elastically against the rotary member.

3. The combination with a knotter-frame, of a cord-holder having the shaft of its rotary member revolubly mounted in said frame, and the non-rotating member mounted upon the shaft between the frame and the rotating member, and connections between the frame and the non-rotating member for holding it from rotation.

4. The combination with a knotter-frame, of a cord-holder having a rotary member revolubly mounted in said frame, a non-rotary member mounted upon the shaft of said rotary member between it and the frame, a connection between said frame and the non-rotary member permitting the latter to move longitudinally upon the shaft of the rotary member, but holding it against rotation thereon, and a spring reacting between the frame and the non-rotating member of the holder to hold the two members elastically together.

5. The combination with a knotter-frame, of a cord-holder having a rotating internally-coned member provided with flutes $f^3$, and a non-rotating member, the latter being externally coned and adapted to lie within the conical recess of the rotating member, said non-rotating member being movable longitudinally upon the shaft of the rotating member, and having its conical part elastically held in relation to the corresponding part of the rotating member.

6. The combination with a knotter, of a cord-holder having a rotating internally-coned member provided with the wing $f'$, an externally-coned non-rotating member having the undercut shoulder $f^{12}$, the said wing adapted to carry the needle-twine against the undercut shoulder, and by its rotation to force said twine along said shoulder into position to be grasped by the jaws of the knotter.

7. The combination with a tying-bill having two positions of rest, namely, a twine-receiving position and a knot-stripping position, of an operating-wheel having a gear-segment, a delay-flange $e^{20}$ extending part way around the periphery of the wheel, a segmental strip $e^{21}$ extending from the end of the gear-segment to the peripheral delay-flange, and a mutilated pinion on the shaft of the tying-bill, said pinion having a delay-surface coöperating with the flange $e^{20}$ of the wheel, and a long tooth $d^{21}$ adapted to coöperate with the strip $e^{21}$ to prevent accidental turning forward of the pinion and hold it in position for the proper engagement of the flange $e^{20}$ with the delay-surface of the pinion.

8. The combination with a knotter-frame, of a cord-holder having the shaft of its rotary member mounted in said frame, and the non-rotary member separate from the frame and mounted on the shaft of said rotary member between it and the frame so as to move longitudinally thereon, said rotary member being provided with a wing or jaw extending in the general direction of its shaft to carry the cord in between the holding-surface of the two members of the holder.

9. The combination with a knotter-frame, of a cord-holder having the shaft of its rotary member mounted in said frame, and the non-rotary member separate from the frame and mounted on the shaft of said rotary member between it and the frame so as to move longitudinally thereon, said non-rotary member being provided with an undercut shoulder, and said rotary member having an oppositely-facing wing or jaw extending in the general direction of its shaft to carry the cord under the shoulder and in between the holding-surface of the two members of the holder.

10. The combination with a knotter-frame, of a cord-holder having the shaft of its rotary member mounted in said frame, and the non-rotary member separate from the frame and mounted on the shaft of said rotary member between it and the frame so as to move longitudinally thereon, said non-rotary member being provided with an undercut shoulder terminating in a transverse ledge at the bottom, and said rotary member having a wing or jaw extending in the general direction of its shaft facing toward the shoulder and operating to carry the cord under the same and in between the holding-surface of the two members of the holder, the transverse ledge serving to prevent the slack cord from getting under the non-rotary member.

WILLIAM BUTTERFIELD.

Witnesses:
ARTHUR JOHNSON,
E. A. ELDRED.